(12) United States Patent
Scheer et al.

(10) Patent No.: US 7,138,439 B2
(45) Date of Patent: Nov. 21, 2006

(54) BIODEGRADABLE COMPOUNDS INCLUDING POLY(LACTIC ACID) POLYMER COMPOSITIONS AND PRODUCTS

(75) Inventors: Frederic Scheer, Manhattan Beach, CA (US); William Kelly, Bailey, CO (US)

(73) Assignee: Biocorp North America, Inc., Los Angeles, CA (US)

( * ) Notice: Subject to any disclaimer, the term of this patent is extended or adjusted under 35 U.S.C. 154(b) by 329 days.

(21) Appl. No.: 10/789,549

(22) Filed: Feb. 27, 2004

(65) Prior Publication Data

US 2005/0192377 A1   Sep. 1, 2005

(51) Int. Cl.
*C08K 3/10* (2006.01)
*C08K 3/34* (2006.01)
*A23B 7/16* (2006.01)

(52) U.S. Cl. ............... 523/100; 523/124; 524/436; 524/42

(58) Field of Classification Search ............. 523/100, 523/124; 524/436, 442
See application file for complete search history.

(56) References Cited

U.S. PATENT DOCUMENTS

| 4,045,418 A | * | 8/1977 | Sinclair | 528/357 |
| 5,462,983 A | * | 10/1995 | Bloembergen et al. | 524/51 |
| 6,136,905 A | * | 10/2000 | Suzuki et al. | 524/310 |

* cited by examiner

*Primary Examiner*—Kriellion Sanders
(74) *Attorney, Agent, or Firm*—Bell, Boyd & Lloyd LLC

(57) ABSTRACT

The present invention relates to biodegradable polymer compositions comprising poly(lactic acid) and co-polyester polymer with adipic acid mixed with organic peroxide and mineral particles. In addition, the present invention relates to products made on the basis of such compositions, such as molded and extruded articles.

23 Claims, No Drawings

BIODEGRADABLE COMPOUNDS INCLUDING POLY(LACTIC ACID) POLYMER COMPOSITIONS AND PRODUCTS

FIELD OF THE INVENTION

The present invention relates to biodegradable polymer compositions comprising poly(lactic acid) and co-polyester polymer with adipic acid compounded with silicate and organic peroxide. In addition, the present invention also relates to products made on the basis of said compositions.

BACKGROUND OF THE INVENTION

Packaging material and disposable beakers, cups and cutlery are used nowadays widely and allow that food material may be sold and/or consumed under hygienic conditions. Such disposable materials and objects are highly estimated by the consumers and the retailers, since they may be simply disposed after use and do not have to be washed and cleaned like conventional dishes, glasses or cutlery.

Yet, the widespread and even growing use of such materials result in a mounting amount of litter produced each day. Currently, the plastic waste is either provided to garbage incinerators or accumulates in refuse dumps, with both of the above-mentioned solutions for waste disposal being associated with problems for the environment.

Thus, there is a need in the art to obviate the above problem and to provide materials, which combine the advantages of currently used plastics material and do not add to environmental pollution.

For preparing the above mentioned items several biodegradable polymers are already known in the state of the art and comprise materials on the basis of e.g. poly(glycolic acid), poly(epsilon-caprolactone), poly(lactic acid), and polydioxanone. The production of these polymers is, however, rather cumbersome and expensive, so that the use thereof is presently mainly restricted to high value medical applications requiring bioabsorbable materials. A few biodegradable resins have been used in applications such as described above but cost has made them un-affordable by the consumers.

An object of the present invention is thus to provide a composition, which composition is degraded in a natural environment in a time period which is significantly shorter as compared to the time period required for the degradation of conventional plastic materials, such as e.g. polyethylene. In a controlled environment such as a composting site the composition will allow biodegradation in period of time not to exceed 180 days, one of the time requirements set by the US specification set by ASTM (ASTM 6400 D99). Moreover, such a composition should also enable production of bags, bottles or cutlery, exhibiting desired properties for the respective purpose.

These and other objects which will become apparent from the subsequent detailed description of the present invention, which provides a composition, which comprises between 40 and 97% by weight of poly(lactic acid) polymer, between 0.5 and 35% by weight of co-polyester polymer with adipic acid, and between 2% and 20% magnesium silicate, each on the basis of the total weight of the biodegradable composition.

SUMMARY OF THE INVENTION

A composition of the present invention is biodegradable when exposed to specific environmental conditions, such as composting, which will result in a loss of some properties that may be measured by standard methods appropriate to the plastic and in the application in a period of time that determines its classification. For instance composting is a managed process that controls the biological decomposition and transformation of biodegradable materials into humus-like substance called compost: the aerobic mesophilic and thermophilic degradation of organic matter to make compost; the transformation of biologically decomposable material through a controlled process of biooxidation that proceed through mesophilic and thermophilic phases and results in the production of carbon dioxide, water, minerals, and stabilized organic matter (compost or humus) (ASTM Terminology) Consequently all main components, poly(lactic acid) and poly(epsilon caprolactone) will be degraded to small organic fragments which will create stabilized organic matter and will not introduce any hazard or heavy metals into soil.

As a result, objects made from the composition of the present invention will not contribute to a further increase of refuse dumps, on the contrary will allow creation of organic fertilizers such as compost, while such objects simultaneously provide all advantages of disposable objects highly estimated by the consumers and producer. Objects made of a composition according to the present invention may be disposed after use, are essentially of lightweight, and have not to be transported to a location where they have to be cleaned. In particular, objects made from a composition according to the present invention provide the advantage that objects thrown away in parks or at the beach will degrade and will vanish after some time. However this invention should not be publicize as a license to litter the environment.

Moreover, a composition according to the present invention may be produced completely or partially from renewable sources, when desired. In addition, a composition according to the present invention may be adapted to various processing methods known in the art.

Also, the compositions according to the present invention provide physical properties not inherent to poly(lactic acid) and provide improvements with respect to the processability, production costs and heat resistance along with improved flexibility and ductility.

DETAILED DESCRIPTION OF THE INVENTION

The present invention relates to a biodegradable plastic. The term "-biodegradable plastic" pertains to a degradable plastic in which the degradation results from the action of naturally occurring microorganisms such as bacteria, fungi, and algae. A degradable plastic is a plastic designed to undergo a significant change in its chemical structure under specific environmental conditions, resulting in a loss of some properties that may be measured by standard tests methods appropriate to the plastic and the application in a period of time that determines its classification. Depending on the additional components present in the composition and the dimensions of the object made from said biodegradable material, the time period required for a degradation will vary and may also be controlled when desired. Generally, the time span for biodegradation will be significantly shorter than the time span required for a degradation of objects made from conventional plastic materials having the same dimensions, such as e.g. polyethylene, which have been designed to last for as long as possible. For example, cellulose and Kraft paper is to biodegrade within 83 days in a compost environment. Our formulation is to biodegrade in a shorter period of time and will pass the tests required by ASTM 6400 D99, which demand that compostable plastic would biodegrade within less than 180 days. Articles made from PE would not degrade under normal composting conditions and PLA-based article would degrade in compost environment in weeks (about 6 to 8 weeks).

Biodegradable polymers are comprised of components which are reduced in film or fiber strength by microbial catalyzed degradation. The biodegradable polymers are reduced to monomers or short chains, which are then assimilated by the microbes. In an aerobic environment, these monomers or short chains are ultimately oxidized to $CO_2$, $H_2O$, and new cell biomass. In an anaerobic environment the monomers or short chains are ultimately oxidized to $CO_2$, $H_2O$, acetate, methane, and cell biomass. Successful biodegradation requires direct physical contact between the biodegradable polymers and the active microbial population or the enzymes produced by the active microbial population. Moreover, certain minimal physical and chemical requirements such as suitable pH, temperature, oxygen concentration, proper nutrients, and moisture level must be met. (cf. U.S. Pat. No. 6,020,393).

A biodegradable composition according to the present invention comprises between 40% by weight to 97% by weight of poly(lactic acid) polymer, between 0.5% by weight to 35% by weight of co-polyester polymer with adipic acid, and between 1 and 32, preferably 2% and 20% magnesium silicate, each on the basis of the total weight of the biodegradable composition.

A composition according to the present invention may be obtained by mixing or blending the respective constituents in the desired amounts. This may be performed according to any method known in by the skilled artisan. For example, poly(lactic acid) polymer and co-polyester polymer with adipic acid may be mixed in pure form, for example blended by means of mill roll blending, and heated to a temperature chosen according to the general knowledge in the art such that at least one of the above-mentioned components is partially or essentially completely molten.

Poly(lactic acid) may be represented by the following structure:

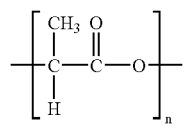

wherein n for example can be an integer between 10 and 250. Poly(lactic acid) can be prepared according to any method known in the state of the art. For example, poly (lactic acid) can be prepared from lactic acid and/or from one or more of D-lactide (i.e. a dilactone, or a cyclic dimer of D-lactic acid), L-lactide (i.e. a dilactone, or a cyclic dimer of L-lactic acid), meso D,L-lactide (i.e. a cyclic dimer of D-, and L-lactic acid), and racemic D,L-lactide (racemic D,L-lactide comprises a 1/1 mixture of D-, and L-lactide).

The preparation of polyesters and copolyesters is well known in the art, such as disclosed in U.S. Pat. No. 2,012, 267. Such reactions are typically operated at temperatures from 150° C. to 300° C. in the presence of polycondensation catalysts such as titanium isopropoxide, manganese diacetate, antimony oxide, dibutyl tin diacetate, zinc chloride, or combinations thereof. The catalysts are typically employed in amounts between 10 to 1000 parts per million (ppm), based on total weight of the reactants (cf. U.S. Pat. No. 6,020,393).

In addition to the Poly(lactic acid) and a copolyester, the composition is compounded with a mineral, comprising magnesium, and/or silicate.

According to another approach, a composition according to the present application may be obtained by mixing the respective amounts of poly(lactic acid) polymer precursors and of co-polyester polymer with adipic acid or respective amounts of a poly(lactic acid) polymer and of precursors of co-polyester polymer with adipic acid with or without a solvent and subjecting the resulting mixture to a polymerization reaction. Poly(lactic acid) polymer precursors are for example lactic acid, cyclic or linear oligomers of lactic acid resulting from condensation reactions of two to fifty lactic acid units, such as e.g. the above-mentioned lactides, and may have any stereo configuration. Compositions made from other poly(lactic acid) polymer precursors and/or precursors of co-polyester polymer with adipic acid may also be used according to the general knowledge of a skilled person in the art.

In particular, a biodegradable composition according to the present invention may comprise between 50 and 85% by weight of poly(lactic acid) polymer, and especially between 55 and 82% by weight of poly(lactic acid) polymer, in particular between 2 and 20% by weight of co-polyester polymer with adipic acid, and especially between 4 and 17% by weight of co-polyester polymer with adipic acid, each on the basis of the total weight of the biodegradable composition.

The biodegradable polymer further comprises between 1 and 32%, preferably between 2% and 25%, more preferably between 5% and 15% by weight of mineral particles, each on the basis of the total weight of the biodegradable composition, said mineral particles comprising at least one of magnesium, and silicate, preferably comprising at least two elements selected from the group consisting of magnesium, and silicate, more preferably comprising magnesium, and silicate. Examples for such minerals are e.g. montmorillonite. The Mineral seems to act as filler, adds strength and imparts stiffness. For example, the mineral particles can have a size of 0.2. to 4.0 μm, more preferably of 1 to 2 μm, most preferably of 1 to μm.

Moreover, during the preparation of a biodegradable polymer according to the present invention an organic peroxide may be added to the reaction mixture in an amount of less than 5% by weight, on the basis of the total weight of the biodegradable final polymer composition.

Examples for organic peroxides which may be used for preparing a composition according to the present invention are e.g. diacetyl peroxide, cumyl-hydroperoxide, and dibenzoyl peroxide. Other organic peroxides known to a skilled person may be used as well. The organic peroxides serve as radical starter molecules initiating a polymerization and help to provide connections, in particular covalent bonds, between the components present in a composition according to the present invention.

Preferably less than 2% of an organic peroxide, more preferably between 0.1% and 1.8%, even more preferred about 1% of an organic peroxide, each on the basis of the total weight of the final biodegradable composition, is added to the reaction mixture for producing the biodegradable polymer composition according to the present invention.

A biodegradable polymer composition of the present invention may also comprise between 5 and 45% by weight of poly(epsilon caprolactone), on the basis of the total weight of the biodegradable composition. Preferably, a composition may comprise between 20 and 40% by weight of poly(epsilon caprolactone, more preferably between 21 and 35% by weight of poly(epsilon caprolactone), on the basis of the total weight of the biodegradable final polymer composition. In particular, an addition of poly(epsilon caprolactone) provides advantages when film or coatings are prepared according to the present invention. PCL will add improved flexibility and allow one to make a clearer, more transparent film.

Moreover, a biodegradable polymer composition may further comprise up to 5% of a mono ester, more preferably between 0.1 and 4.5% by weight of a mono ester, on the basis of the total weight of the biodegradable composition. The mono-ester may be a carboxylic acid, a sulfonic acid or a phosphoric acid having e.g. between 2 and 20 carbon atoms and comprising aliphatic (having branched or linear chains) and/or aromatic structural units. In particular, said mono ester can be a mono ester of a compound comprising at least two carboxyl groups and/or may be for example chosen from the group consisting of adipic acid and lactic acid. In particular, an addition of a mono ester can be useful when formulating injection molding formulations. This will serve as a processing aid and will protect polymers from thermo-abuse.

Additionally, a biodegradable polymer composition of the present invention can also comprise one or more plasticizers. A plasticizer as used in a composition according to the present invention, as well as the thereof resulting degradation products should be preferably associated with essentially no or only low environmental risks, such that upon degradation of a composition of the present invention the respective site where the degradation takes place will not or essentially not be polluted. Plasticizers for use in a composition according to the present invention can therefore be for example naturally occurring compounds. Examples for plasticizers are e.g. organic citrate esters (cf. U.S. Pat. No. 5,556,905).

Depending on the specific applications desired, a biodegradable polymer composition of the present invention may also comprise additional additives or components well known in the art, such as e.g. natural coloring agents, additional polymeric compounds, cellulose, etc.

In addition, a composition according to the present invention may also be applied on a carrier material, such as e.g. paper, composite material, plastics, metal, wood, etc.

The present biodegradable polymer composition may be used for various applications and should not be restricted to those the exemplarily disclosed herein. For example, also applications in the medical field, such as e.g. for sutures, and drug release matrices, or in the print industry are conceivable.

A composition of the present invention may be used for the production of various articles, such as e.g. molded articles and/or extruded articles. The term "molded article" (or "extruded article") as used in the present invention comprises articles made according to a molding process (or an extrusion process). A "molded article" (or "extruded article") can also be part of another object, such as e.g. an insert in a container or a knife blade or fork insert in a corresponding handle.

A molded article according to the present invention comprises a biodegradable composition, which biodegradable composition comprises between 40 and 97% by weight of poly(lactic acid) polymer, and between 0.5 and 35% by weight of co-polyester polymer with adipic acid, each on the basis of the total weight of the biodegradable composition.

In particular, a biodegradable composition for an molded article according to the present invention can comprise between 50 and 85% by weight of poly(lactic acid) polymer, and especially between 55 and 82% by weight of poly(lactic acid) polymer, in particular between 2 and 20% by weight of co-polyester polymer with adipic acid, and especially between 4 and 17% by weight of co-polyester polymer with adipic acid, each on the basis of the total weight of the biodegradable composition. As outlined in detail before, the composition for the preparation of such molded articles can comprise in addition to the above-mentioned components mineral particles comprising at least one of magnesium, and silicon, organic peroxide(s), mono ester(s), and/or natural plasticizer(s).

Examples for various molded article are utensils, forks, spoons, knives, chopsticks, containers, cups, foam material products, and pots.

When preparing an injection molding formulation, a composition according to the present invention may be used, which comprises between 80% and 97% by weight of poly(lactic acid) polymer, between 2% and 10% by weight of co-polyester polymer with adipic acid, and less than 5% by weight of mono ester, and more preferably between 82% and 95% by weight of poly(lactic acid) polymer, between 3% to 8% by weight of co-polyester polymer with adipic acid, and between 0.1 and 4% by weight of mono ester, and most preferably between 85% and 90% by weight of poly (lactic acid) polymer, between 5% to 7% by weight of co-polyester polymer with adipic acid, and between 1 and 3% by weight of mono ester, each on the basis of the total weight of the biodegradable composition.

Alternatively, an injection molding formulation can comprise between 50% and 75% by weight of poly lactic acid polymer, between 5% and 15% by weight of co-polyester polymer with adipic acid, between 10% and 30% by weight of mineral particles comprising at least one element selected from the group consisting of magnesium, and silicon, and less than 2% by weight of organic peroxide, more preferably between 55% and 70% by weight of poly lactic acid polymer, between 8% and 12% by weight of co-polyester polymer with adipic acid, between 15% and 25% by weight of mineral particles comprising at least one element selected from the group consisting of magnesium, and silicon, and between 0.1 and 1.8% by weight of organic peroxide, and most preferably between 58% and 67% by weight of poly lactic acid polymer, between 9% and 11% by weight of co-polyester polymer with adipic acid, between 18% and 22% by weight of mineral particles comprising at least one element selected from the group consisting of magnesium, and between 0.5 and 1.0% by weight of organic peroxide, each on the basis of the total weight of the biodegradable composition.

An extruded article according to the present invention comprises a biodegradable composition, which biodegradable composition comprises between 40 and 97% by weight of poly(lactic acid) polymer, and between 0.5 and 35% by weight of co-polyester polymer with adipic acid, each on the basis of the total weight of the biodegradable composition. In particular, a biodegradable composition for an extruded article according to the present invention can comprise between 50 and 85% by weight of poly(lactic acid) polymer, and especially between 55 and 82% by weight of poly(lactic acid) polymer, in particular between 2 and 20% by weight of co-polyester polymer with adipic acid, and especially between 4 and 17% by weight of co-polyester polymer with adipic acid, each on the basis of the total weight of the biodegradable composition. As outlined in detail before, the composition for the preparation of such molded articles can comprise in addition to the above-mentioned components mineral particles comprising at least one of magnesium, and silicon, organic peroxide(s), mono ester(s), and/or natural plasticizer(s).

Extruded articles may be for example films, trash bags, grocery bags, container sealing films, pipes, drinking straws, spun-bonded non-woven materials, and sheets.

When preparing a formulation intended for Blown Film Extrusion, a composition according to the present invention may be used which comprises e.g. between 40% and 60% by weight of poly(lactic acid) polymer, less than 5% by weight of co-polyester polymer with adipic acid, between 20% and 40% by weight of poly(epsilon caprolactone), between 5% and 10% by weight of mineral particles comprising at least one element selected from the group consisting of magnesium, and silicon, less than 5% by weight of organic peroxide, and less than 10% by weight of plasticizer, preferably between 45% and 55% by weight of poly(lactic acid) polymer, between 0.1 and 4.5% by weight of co-polyester polymer with adipic acid, between 22% and 35% by weight of poly(epsilon caprolactone), between 6% and 9% by weight of mineral particles comprising at least one element selected from the group consisting of magnesium, and silicon, between 0.1 and 4.5% by weight of organic peroxide, and between 0.1 and 8% by weight of plasticizer, more preferably between 47% and 52% by weight of poly(lactic acid) polymer, between 1 and 4% by weight of co-polyester polymer with adipic acid, between 25% and 30% by weight of poly(epsilon caprolactone), between 7% and 8% by weight of mineral particles comprising at least one element selected from the group consisting of magnesium, and silicon, between 1 and 4% by weight of organic peroxide, and between 0.5 and 6% by weight of plasticizer, each on the basis of the total weight of the biodegradable composition.

A formulation for producing a flexible film on the basis of a composition according to the present invention can comprise between 40% and 60% by weight of poly lactic acid polymer, between 15% and 35% by weight of co-polyester polymer with adipic acid, between 10% and 20% by weight of mineral particles comprising at least one element selected from the group consisting of magnesium, and silicon, and less than 5% by weight of organic peroxide, preferably between 43% and 57% by weight of poly lactic acid polymer, between 20% and 30% by weight of co-polyester polymer with adipic acid, between 12% and 18% by weight of mineral particles comprising at least one element selected from the group consisting of magnesium, and silicon, and between 0.1 and 4.5% by weight of organic peroxide, more preferably between 45% to 52% by weight of poly lactic acid polymer, between 22% and 27% by weight of co-polyester polymer with adipic acid, between 14% and 17% by weight of mineral particles comprising at least one element selected from the group consisting of magnesium, and silicon, and between 1 and 4% by weight of organic peroxide, each on the basis of the total weight of the biodegradable composition.

Articles of the present invention produced on the basis of a blown film extrusion formulation or a flexible film formulation are for example films for bags, such as trash bags, as well as grocery bags, or films for sealing containers.

A formulation for a profile extrusion process on the basis of a composition according to the present invention can comprise e.g. between 65% and 85% by weight of poly (lactic acid) polymer, between 10% and 20% by weight of co-polyester polymer with adipic acid, and between 2% and 15% by weight of mineral particles comprising at least one element selected from the group consisting of magnesium, and silicon, preferably between 68% and 80% by weight of poly(lactic acid) polymer, between 12% and 18% by weight of co-polyester polymer with adipic acid, and between 3% and 12% by weight of mineral particles comprising at least one element selected from the group consisting of magnesium, and silicon, more preferably between 70% and 77% by weight of poly(lactic acid) polymer, between 14% and 17% by weight of co-polyester polymer with adipic acid, and between 4% and 10% by weight of mineral particles comprising at least one element selected from the group consisting of magnesium, and silicon, each on the basis of the total weight of the biodegradable composition.

Articles according to the present invention made from a Profile Extrusion Formulation are for example drinking straws and pipes.

A formulation for a thermoform extrusion process on the basis of a composition according to the present invention can comprise between 75% and 85% by weight of poly (lactic acid) polymer, between 5% and 15% by weight of co-polyester polymer with adipic acid, between 5% and 15% by weight of mineral particles comprising at least one element selected from the group consisting of magnesium, and silicon, and less than 5% by weight of organic peroxide, preferably between 78% and 84% by weight of poly(lactic acid) polymer, between 7% and 12% by weight of co-polyester polymer with adipic acid, between 7% and 12% by weight of mineral particles comprising at least one element selected from the group consisting of magnesium, and silicon, and between 0.1 and 4.5% by weight of organic peroxide, more preferably between 79% and 83% by weight of poly(lactic acid) polymer, between 8% and 11% by weight of co-polyester polymer with adipic acid, between 8% and 11% by weight of mineral particles comprising at least one element selected from the group consisting of magnesium, and silicon, and between 0.5 and 4% by weight of organic peroxide, each on the basis of the total weight of the biodegradable composition.

Articles according to the present invention made from a thermoform extrusion method are e.g. sheets for producing cups, plates and bottles and other objects, which could be outside of the food service industry.

In addition, the present invention provides a process of producing an article comprising a biodegradable composition, said process comprising the steps of providing a biodegradable composition comprising between 40 and 97% by weight of poly(lactic acid) polymer, and between 0.5 and 35% by weight of co-polyester polymer with adipic acid, each on the basis of the total weight of the biodegradable composition, and subjecting said biodegradable composition to a process selected from the group consisting of injection molding, blown film extrusion, profile extrusion, and thermoform extrusion.

Injection molding, blown film extrusion, profile extrusion and thermoform extrusion are processes known to a skilled person and are described for example in Modem Plastics Encyclopedia, Published by McGraw-Hill, Inc.—mid-October 1991 edition.

DESCRIPTION OF THE CURRENTLY PREFERRED EMBODIMENTS

The present invention will be described now in detail on the basis of the following non-limiting examples given by way of an example only.

EXAMPLE 1

Injection Molding Formulation I

An injection molding formulation is prepared which comprises
94% by weight poly(lactic acid) polymer
5% by weight (co-polyester polymer with adipic acid)
1% by weight Zinc stearate The above-mentioned compounds are mixed by means of extrusion compounding at a temperature of 160° C. during about 2 to 10 minutes Then, the resulting mixture is filled in a injection molding device at a temperature of about 160° C. and is injected into a mold at a temperature of about 20° C. in order to obtain an injection molded cup.

EXAMPLE 2

Injection Molding Formulation H

An injection molding formulation is prepared which comprises
74.5% by weight poly (lactic acid) polymer
5% by weight (co-polyester polymer with adipic acid)
20% by weight of magnesium silicate
0.5% by weight of 2,5-Dimethyl-2,5-di(t-butyl peroxy) hexane The injection molding formulation is prepared as detailed in Example 1 and injection molded products may be obtained according to the steps lined out in said Example 1.

EXAMPLE 3

Blown Film Extrusion Formulation

A blown film extrusion formulation is prepared which comprises
55% by weight poly (lactic acid) polymer 0 to 15% by weight (co-polyester polymer with adipic acid)
25% by weight (poly epsilon caprolactone)
4% by weight of magnesium silicate
1.0% by weight of 2,5-Dimethyl-2,5-di(t-butyl peroxy) hexane
15% by weight of tributyl citrate The resulting mixture is filled in a blow film extrusion device and a self-supporting film having a thickness of 10 µm-90 µm is obtained which may be used for trash or grocery bags.

EXAMPLE 4

Flexible Film Formulation

A flexible film formulation is prepared which comprises
70% by weight poly (lactic acid) polymer
19% by weight (co-polyester polymer with adipic acid)
10% by weight of tributyl citrate
1% by weight of 2,5-Dimethyl-2,5-di(t-butyl peroxy) hexane The above-mentioned compounds are mixed by twin screw compounding. The resulting mixture is filled in a extrusion device at a temperature of 160° C. and a self-supporting film having a thickness of about 10 mm is obtained which may be used for sealing containers.

EXAMPLE 5

Profile Extrusion Formulation

A profile extrusion formulation is prepared which comprises:
75% by weight poly lactic acid polymer
20% by weight of co-polyester polymer with adipic acid
5% by weight of magnesium silicate The above-mentioned compounds are mixed by twin screw compounding. The resulting mixture is filled in a profile extrusion device at a temperature of about 160° C. and a tube is obtained which may be used as a drinking straw.

EXAMPLE 6

Thermoform Extrusion Formulation

A thermoform extrusion formulation is prepared which comprises:
75% by weight poly lactic acid polymer
15% by weight of co-polyester polymer with adipic acid
9% by weight of magnesium silicate
1% by weight of 2,5-Dimethyl-2,5-di(t-butyl peroxy) hexane The above-mentioned compounds are mixed by twin screw compounding. The resulting mixture is filled in a thermoform extrusion device at a temperature of 160° C. and a sheet having a thickness between 0.1 mm to 45 mm is obtained which may be used for forming cups, plates or bottles.

Numerous modifications and variations of the present invention are possible in light of the above teachings. It is therefore to be understood that within the scope of the appended claims, the invention may be practiced otherwise than as specifically described herein.

The invention claimed is:

1. A biodegradable composition for the preparation of items in contact with food material, comprising:
   between 40 and 97% by weight of poly(lactic acid) polymer, and
   between 0.5 and 35% by weight of co-polyester polymer with adipic acid, and
   between 1 and 32% by weight of mineral particles, wherein said mineral particles further comprise at least one component selected from the group consisting of magnesium, silicate and combinations thereof, each on the basis of the total weight of the biodegradable composition.

2. The biodegradable polymer composition according to claim 1, to which composition during its preparation less than 5% of an organic peroxide, on the basis of the total weight of the final biodegradable composition, has been added.

3. The biodegradable composition according to claim 2, wherein the amount of organic peroxide added is less than 2%.

4. The biodegradable composition according to claim 2, wherein the amount of organic peroxide added is between 0.1 and 1.8%, on the basis of the total weight of the final biodegradable composition.

5. The biodegradable polymer composition according to claim 2, wherein said organic peroxide is selected from the group consisting of diacetyl peroxide, cumyl-hydro-peroxide, and dibenzoyl peroxide, dialkyl peroxide, 2,5-methyl-2,5-di (terbutylperoxy)-hexane and mixtures thereof.

6. The biodegradable polymer composition according to claim 1, said composition further comprising between 5 and 45% by weight of poly(epsilon caprolactone), on the basis of the total weight of the biodegradable composition.

7. The biodegradable polymer composition according to claim 1, said composition further comprising a plasticizer.

8. A molded article comprising a biodegradable composition, said biodegradable composition comprising:

between 40 and 97% by weight of poly(lactic acid) polymer, between 0.5 and 35% by weight of co-polyester polymer with adipic acid, and between 1 and 32% by weight of mineral particles, wherein said mineral particles further comprise at least one component selected from the group consisting of magnesium, silicate and combinations thereof, each on the basis of the total weight of the biodegradable composition.

9. The molded article according to claim 8, said molded article being selected from the group consisting of utensils, food service-ware, forks, spoons, knives, chopsticks, containers, cups, foam material products, plates and pots.

10. The molded article according to claim 8, to which composition during its preparation less than 5% of an organic peroxide, on the basis of the total weight of the biodegradable composition, has been added.

11. The molded article according to claim 10, to which composition during its preparation less than 2% of an organic peroxide, on the basis of the total weight of the biodegradable composition, has been added.

12. The molded article according to claim 10, to which composition during its preparation between 0.1% and 1.8% of an organic peroxide, on the basis of the total weight of the biodegradable composition, has been added.

13. The molded article according to claim 8, said composition further comprising up to 5% of a mono-ester, on the basis of the total weight of the biodegradable composition and/or a plasticizer.

14. An extruded article comprising a biodegradable composition, said biodegradable composition comprising:

between 40 and 97% by weight of poly(lactic acid) polymer, and between 0.5 and 35% by weight of co-polyester polymer with adipic acid, and between 1 and 32% by weight of mineral particles, wherein said mineral particles further comprise at least one component selected from the group consisting of magnesium, silicate and combinations thereof, each on the basis of the total weight of the biodegradable composition.

15. The extruded article according to claim 14, said extruded article being selected from the groups consisting of films, trash bags, grocery bags, container sealing films, pipes, drinking straws, spun-bonded non-woven material, and sheets.

16. The extruded article according to claim 14, to which composition during its preparation less than 5% of an organic peroxide between 5 and 45% by weight of poly (epsilon caprolactone), on the basis of the total weight of the biodegradable composition.

17. The extruded article according to claim 14, wherein the composition further comprises up to 5% of a mono-ester, on the basis of the total weight of the biodegradable composition, and/or a plasticizer.

18. A method of producing an article comprising a biodegradable composition, said process comprising the steps of:

(i) providing a biodegradable composition, said composition comprising between 40 and 97% by weight of poly(lactic acid) polymer, and between 0.5 and 35% by weight of co-polyester polymer with adipic acid, and between 1 and 32% by weight of mineral particles, wherein said mineral particles further comprise at least one component selected from the group consisting of magnesium, silicate and combinations thereof, each on the basis of the total weight of the biodegradable composition, (ii) mixing the constituents of (i);

(iii) heating the mixture to a temperature of from 150 to 200° C. and (iv) forming the resultant mixture to obtain a desired shape.

19. The method of claim 18, wherein the step of forming includes subjecting said biodegradable composition to a process selected from injection molding, blown film extrusion, profile extrusion, and thermoform extrusion.

20. A method of producing an article comprising a biodegradable composition, said process comprising the steps of:

(i) providing a biodegradable composition, said composition comprising between 40 and 97% by weight of poly(lactic acid) polymer, and between 0.5 and 35% by weight of co-polyester polymer with adipic acid, and between 1 and 32% by weight of mineral particles, wherein said mineral particles further comprise at least one component selected from the group consisting of magnesium, silicate and combinations thereof, each on the basis of the total weight of the biodegradable composition, (ii) mixing the constituents of (i) with at least one organic peroxide;

(iii) heating the mixture to a temperature of from 150 to 200° C. and (iv) forming the resultant mixture to obtain a desired shape.

21. The method of claim 20, wherein the organic peroxide is added in an amount of less than 5% by weight, on the basis of the total weight of the final biodegradable composition.

22. The method of claim 20, wherein the organic peroxide is added in an amount between 0.1 and 1.8%, on the basis of the total weight of the final biodegradable composition.

23. The method of claim 20, wherein the organic peroxide is selected from the group consisting of diacetyl peroxide, cumyl-hydro-peroxide, and dibenzoyl peroxide, dialkyl peroxide, 2,5-methyl-2,5-di (terbutylperoxy)-hexane and mixtures thereof.

* * * * *